United States Patent [19]

Stewart

[11] Patent Number: 5,048,218
[45] Date of Patent: Sep. 17, 1991

[54] GAME LURING DEVICE

[76] Inventor: Edwin Stewart, Rte. 6, Box 147, Winchester, Va. 22601

[21] Appl. No.: 585,018

[22] Filed: Sep. 18, 1990

[51] Int. Cl.$^5$ ............................................. A01M 31/06
[52] U.S. Cl. ............................................. 43/1; 43/131
[58] Field of Search ........................ 43/1, 2, 131, 124; 239/145, 302, 136, 51; 222/173, 187

[56] References Cited

U.S. PATENT DOCUMENTS

| | | | |
|---|---|---|---|
| 2,975,464 | 3/1961 | Schultz | 222/187 |
| 3,152,762 | 10/1964 | Englehart | 222/187 |
| 3,257,077 | 6/1966 | Corning | 239/145 |
| 4,667,430 | 5/1987 | Ziese, Jr. | 43/1 |
| 4,937,431 | 6/1990 | Jameson et al. | 43/1 |

FOREIGN PATENT DOCUMENTS 1179851 5/1959 France ............................... 222/187

Primary Examiner—Kurt Rowan
Assistant Examiner—Chuck Y. Mah
Attorney, Agent, or Firm—Leon Gilden

[57] ABSTRACT

A game luring device includes a container mounting a liquid absorbent wick therewithin wherein the wick includes a central rigid core upon which the wick is secured with the core extending above the wick coaxially thereof and mounted within inverted conical plug. The plug includes a hook member for positioning of the organization with a support such as a tree limb and the like. A game luring liquid is directed within the container and directed from the wick upwardly whereupon positioning of the wick above the container the game luring scent is distributed by airborne currents. Modifications of the invention include a matrix of projecting wick legs mounted to and extending beyond the central wick core to enhance airborne distribution of the game luring scent contained within the container member.

3 Claims, 6 Drawing Sheets

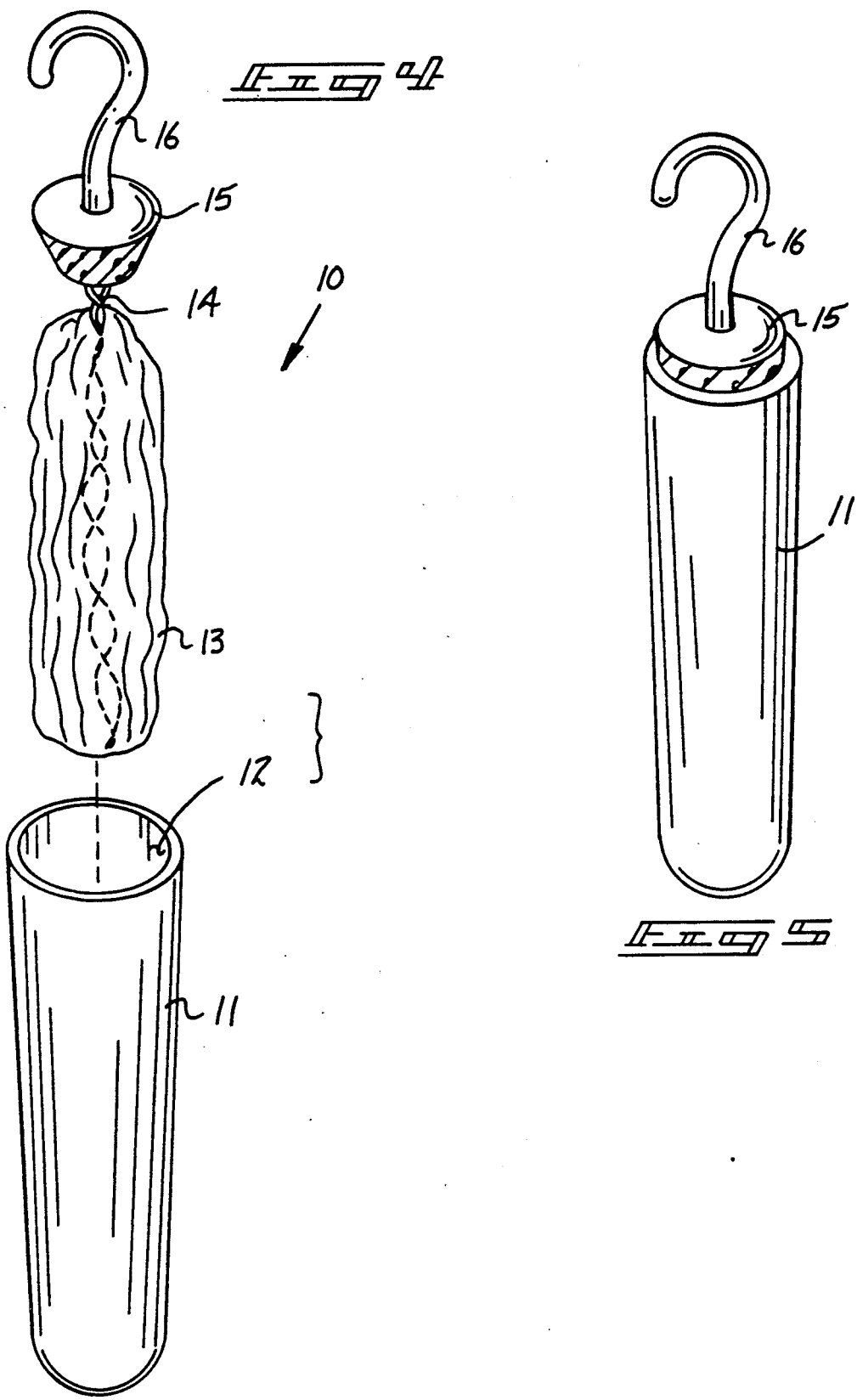

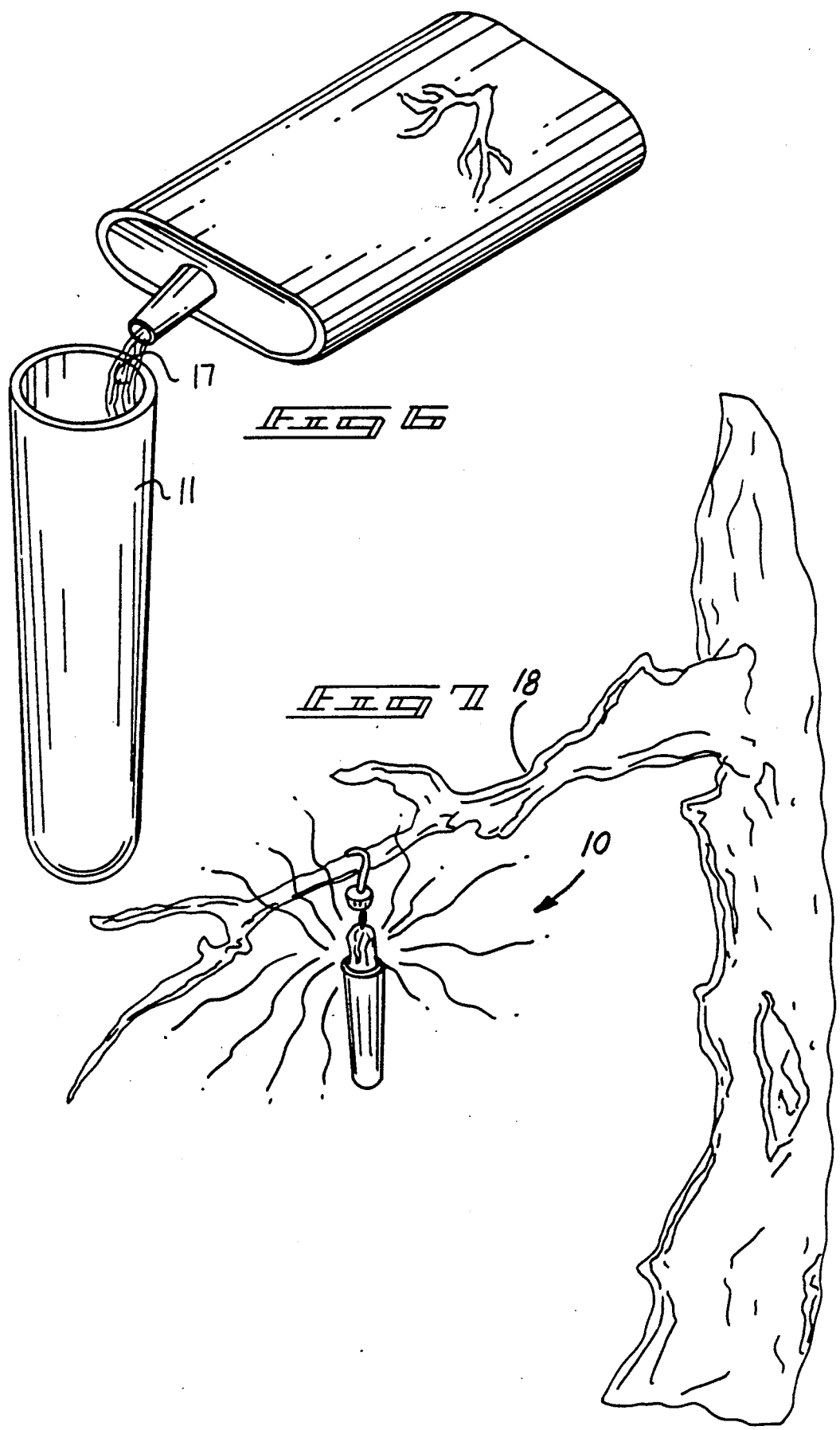

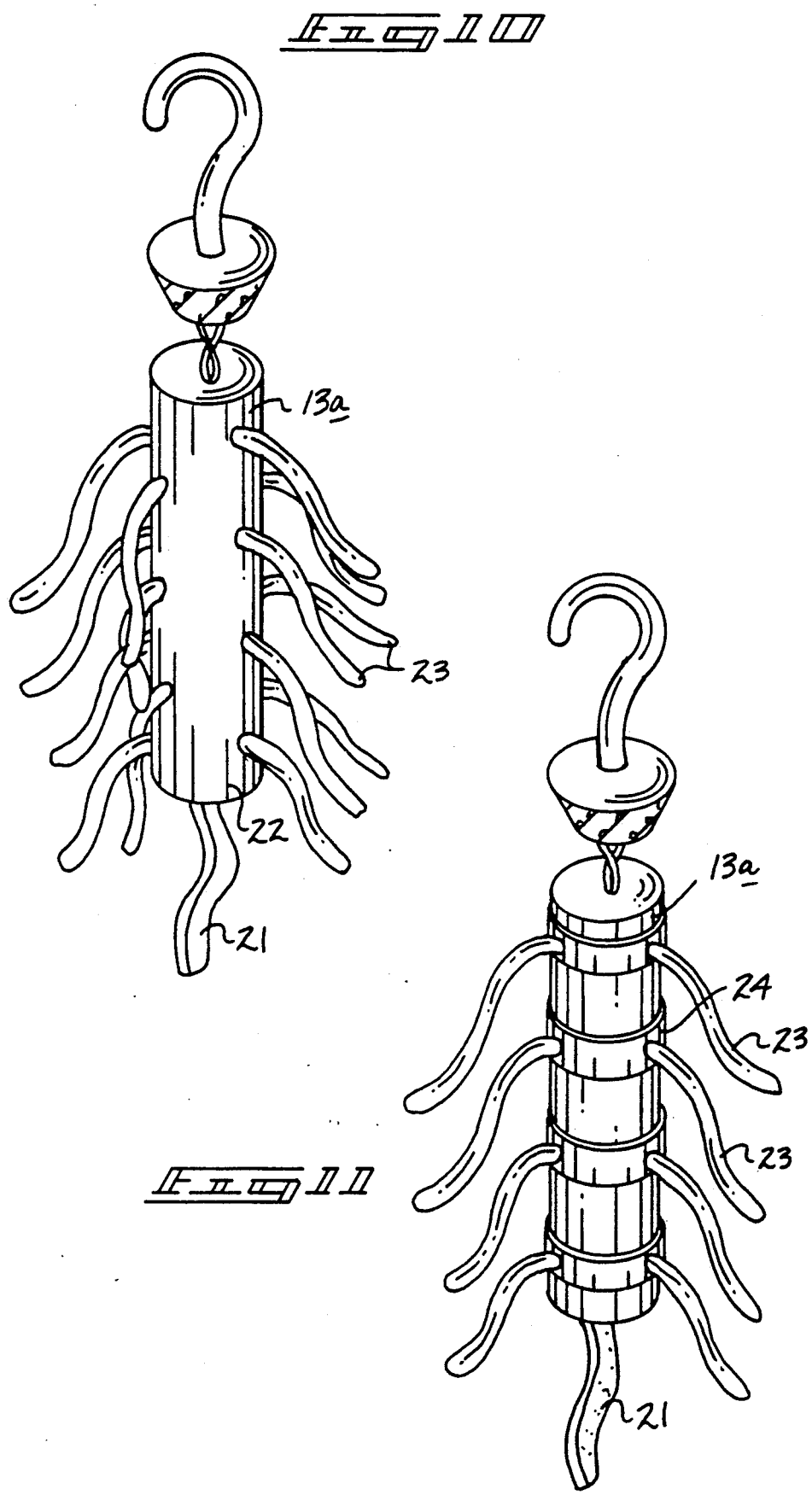

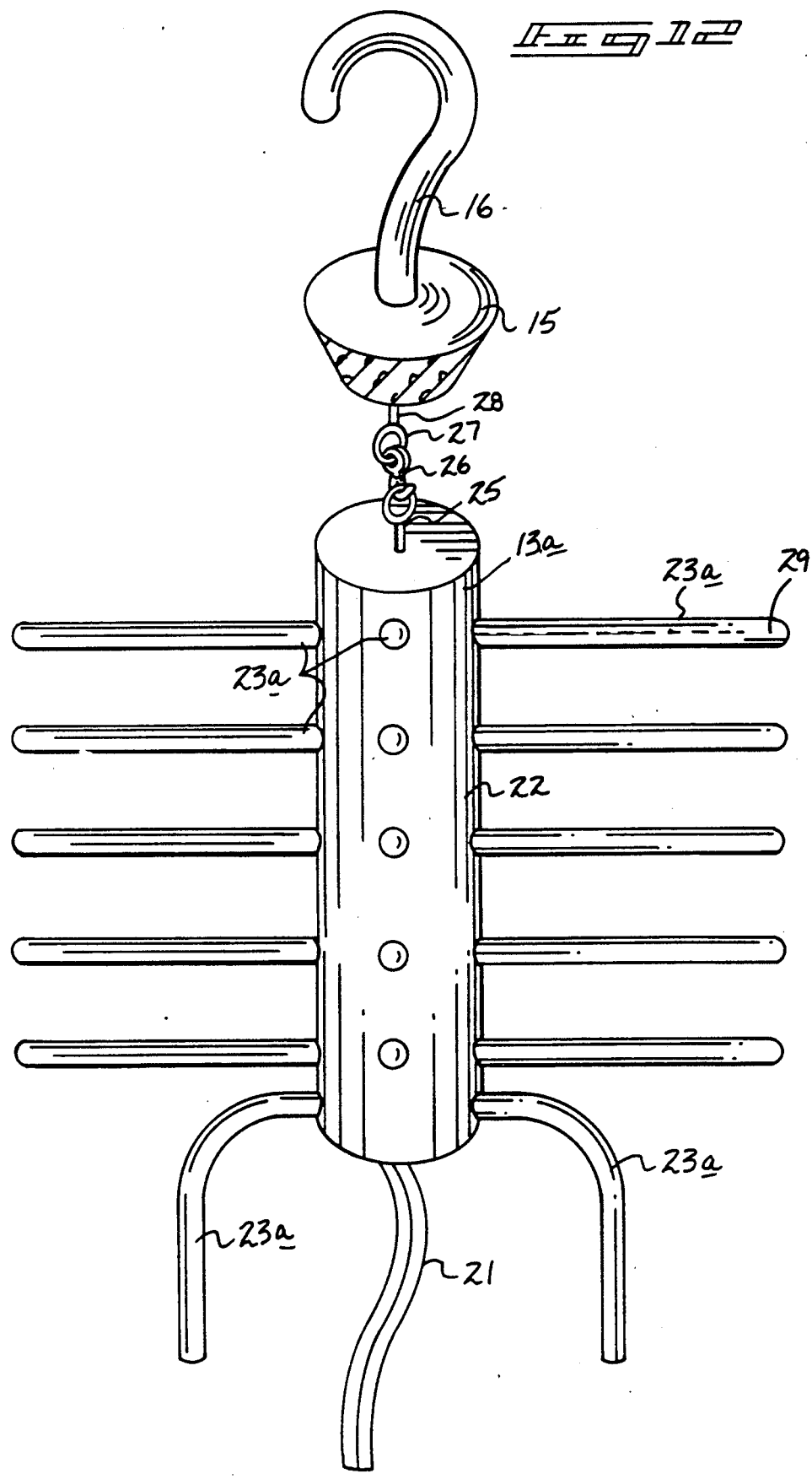

GAME LURING DEVICE

BACKGROUND OF THE INVENTION

1. Field of the Invention

The field of the invention relates to game luring devices, and more particularly pertains to a new and improved game luring device wherein the same is arranged for the distribution of a game luring fluid by airborne currents.

2. Description of the Prior Art

In a hunting scenario, it is frequently desirable to direct a lure in the form of an airborne scent for attracting game animals particularly during periods of the year when hunting seasons prevail that coincide with game animal mating periods. During this period of time, directing of a scent and propagating such into a hunting environment is frequently successful in attracting a game animal. Examples of prior art devices include U.S. Pat. No. 4,302,899 to DEHART wherein a pad saturated with a game luring scent is mounted within a container that is selectively securable to a portion of clothing or even a surrounding support such as a tree limb and the like.

U.S. Pat. No. 3,046,192 to BILYEU sets forth a game luring device wherein a catalytic heater and pad is impregnated with a game luring scent that is vaporized and directed into surrounding atmosphere during heating of the catalytic heater.

U.S. Pat. No. 4,186,502 to FOSTER provides a boot structure with a pocket portion mounting a game luring scent therewithin to direct such scent about a pathway to be traversed by an associated hunter.

As such, it may be appreciated that there continues to be a need for a new and improved game luring device as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of game luring devices present in the prior art, the present invention provides a new and improved game luring device wherein the same utilizes individual or an array of wicks to direct a game luring scent from an underlying container. As such, the general purpose of the present invention, which will be described subsequently in greater detail, is to provide a new and improved game luring device which has all the advantages of the prior art game luring devices and none of the disadvantages.

To attain this, the game luring device of the invention includes a container mounting a liquid absorbent wick therewithin wherein the wick includes a central rigid core upon which the wick is secured with the core extending above the wick coaxially thereof and mounted within inverted conical plug. The plug includes a hook member for positioning of the organization with a support such as a tree limb and the like. A game luring liquid is directed within the container and directed from the wick upwardly whereupon positioning of the wick above the container the game luring scent is distributed by airborne currents. Modifications of the invention include a matrix of projecting wick legs mounted to and extending beyond the central wick core to enhance airborne distribution of the game luring scent contained within the container member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved game luring device which has all the advantages of the prior art game luring devices and none of the disadvantages.

It is another object of the present invention to provide a new and improved game luring device which may be easily and efficiently manufactured and marketed.

It is a further object of the present invention to provide a new and improved game luring device which is of a durable and reliable construction.

An even further object of the present invention is to provide a new and improved game luring device which is susceptible of a low cost of manufacture with regard to both materials and labor, and which accordingly is then susceptible of low prices of sale to the consuming public, thereby making such game luring devices economically available to the buying public.

Still yet another object of the present invention is to provide a new and improved game luring device which provides in the apparatuses and methods of the prior art some of the advantages thereof, while simultaneously overcoming some of the disadvantages normally associated therewith.

Still another object of the present invention is to provide a new and improved game luring device which may be compactly stored when not being utilized.

Yet another object of the present invention is to provide a new and improved game luring device wherein the same may be conveniently suspended from an associated support such as a tree limb and the like and wherein the same permits propagation of an associated game luring scent from an underlying reservoir into an associated atmosphere.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of the instant invention.

FIG. 5 is an isometric illustration of the instant invention in an assembled configuration.

FIG. 6 is an isometric illustration of the instant invention with a predetermined quantity of a game lure directed therewithin.

FIG. 7 is an isometric illustration of the instant invention suspended from an associated tree limb.

FIG. 10 is an isometric illustration of a further modified wick structure utilized by the instant invention.

FIG. 11 is an isometric illustration of a yet further modified wick structure utilized by the instant invention.

FIG. 12 is a yet further wick structure utilized by the instant invention.

DESCRIPTION OF THE PREFERRED EMBODIMENT

Figure 1:
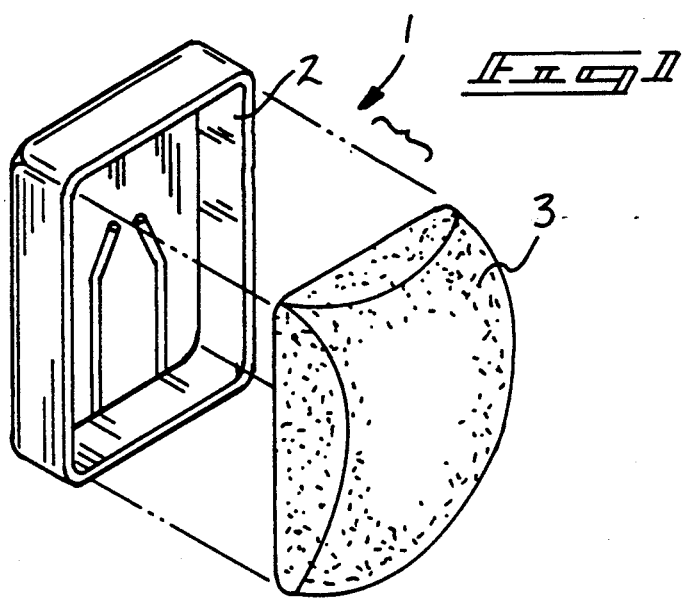
FIG. 1 is an isometric illustration of a prior art game luring device.

With reference now to the drawings, and in particular to FIGS. 1 to 12 thereof, a new and improved game luring device embodying the principles and concepts of the present invention and generally designated by the reference numeral 10 will be described.

Figure 2:
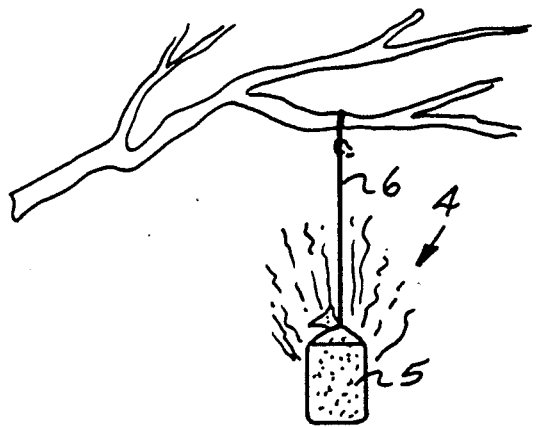
FIG. 2 is an orthographic view taken in elevation of a further prior art game luring device.
Figure 3:
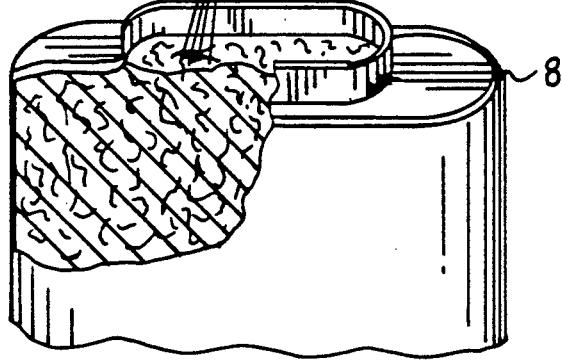
FIG. 3 is an isometric illustration of the catalytic heater reservoir for use of the device set forth in FIG. 2.

FIG. 1 illustrates a prior art game luring device 1 wherein a container 2 receives a pad 3 formed of an absorbent material to receive a predetermined quantity of game lure thereon wherein the container is selectively securable to a clothing garment or support structure element such as a tree. FIG. 2 illustrates a further prior art game luring device 4 wherein a porous bag member 5 is suspended by a tether line 6. FIG. 3 illustrates the use of a conventional catalytic heater 8 receiving a predetermined quantity of fluid 7 therewithin wherein the absorbent material receiving the fuel is also impregnated with a game luring scent to be dispersed upon heating of the fuel within the bag member as illustrated in FIG. 2.

More specifically, the game luring device of the instant invention essentially comprises an elongate axially aligned container 11 defined by an annular opening at its upper end with an elongate cavity 12 extending within the container as illustrated in FIG. 4. An elongate axially aligned fibrous wick core 13 of a length substantially equal to that as defined by the cavity is frictionally maintained within the cavity and is extensible therefrom and includes a rigid twisted wire spine 14 coextensive with and coaxial of the core 13 to mount the core thereabout. An inverted truncated conical plug 15 is mounted coaxially about the spine 14 mounted above and adjacent to the core 13 with a support hook 16 extending upwardly of and coaxially of the plug 15 to permit suspension of the organization from an associated support such as a tree limb 18 as exemplified in FIG. 7. A game luring liquid 17 is deposited within the cavity 12 of the container 11 prior to insertion of the core 13 therewithin whereupon extension of the core 13 relative to the container permits projection of the scent in a surrounding environment in a manner as illustrated in FIG. 7. During periods of non-use the plug 15 is directed interiorly of the cavity 12 to sealingly secure the core 13 within the cavity to prevent evaporation from the container 12 of the game luring liquid 17.

Figure 8:
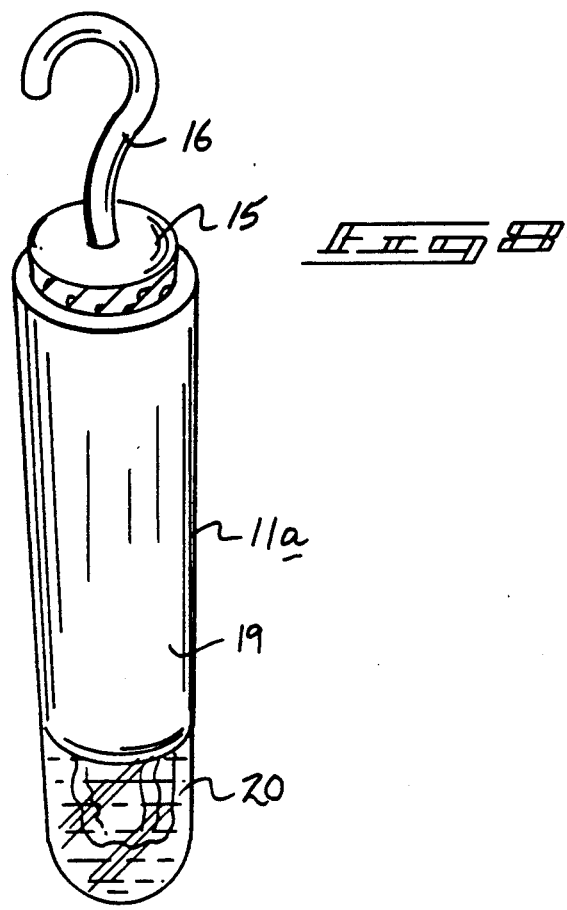
FIG. 8 is an isometric illustration of a modified container utilized by the instant invention.
Figure 9:
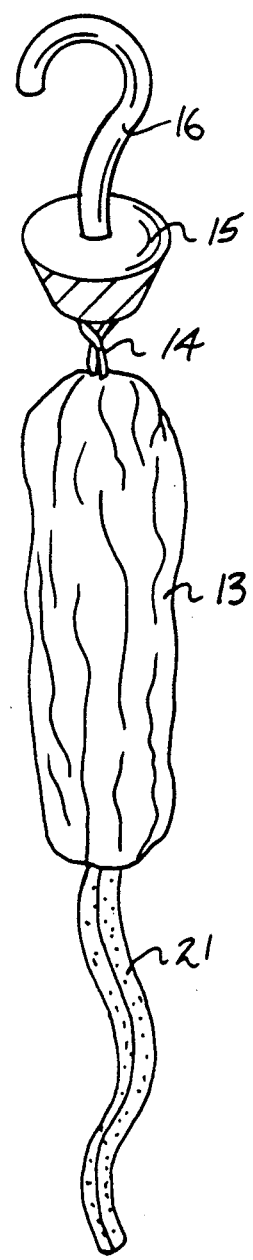
FIG. 9 is an isometric illustration of a modified wick structure utilized by the instant invention.

FIG. 8 illustrates the use of a modified container 11a including an opaque upper body portion coextensive about a major surface of the modified container 11a and including a transparent lower body portion 20 to permit visual observation of remaining liquid within the container to permit replenishment of the container when the game luring liquid 17 falls below a desired level, i.e, below an interface between the opaque and transparent portions 19 and 20. To enhance directing of the liquid 17 into the core 13, an elongate flexible wick leg 21 formed of an absorbent fibrous material extends coaxially of and below the core 13 whereupon extension of the core 13 relative to the container 11a permits positioning of the flexible wick leg 21 within remaining game luring liquid 17 within the container.

FIG. 10 and FIG. 11 illustrate modified wick cores 13a formed as a cylindrical fibrous body 22 including a matrix of radially projecting polymeric sponge type legs 23 wherein the radially projecting legs 23 are of a greater porosity than that defined by the cylindrical fibrous body 22 and enhance airborne distribution of the game luring liquid 17 therethrough. FIG. 11 illustrates the use of circumferential support bands 24 to enhance geometric integrity of the cylindrical fibrous body 22 during repeated use and to orient the radially projecting legs 23 relative to the body 22.

FIG. 12 illustrates the fibrous body 22 and modified radially projecting legs **23*a* formed with a deformable wire core 29 coextensively and coaxially through each of the modified radially projecting legs 23*a* to permit selective positioning of the legs relative to the body 22 whereupon projecting of the legs in a spaced position above the associated container 11 permits the legs to mesh contact with air currents passing thereby and even permits rotation of the cylindrical fibrous body 22 and the associated container when suspended in a manner as illustrated in FIG. 7. To effect this procedure, the twisted wire core is formed with an upper first loop member 25 at an upper terminal end of the twisted wire core spaced from a second loop 27 with a swivel connector 26 mounted therebetween to permit relative rotation of the first loop 25 relative to the second loop 27. The second loop 27 is mounted to a second support leg 28 that is fixedly mounted coaxially of the conical plug 15**.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the Unites States is as follows:

1. A game luring device comprising in combination, an elongate longitudinally aligned container defining an open upper end including a cavity defined within the container, and an elongate axially aligned fibrous wick core defined by a predetermined porosity is telescopingly mounted within the container, and the fibrous wick core includes a rigid wire spine coaxially mounted relative to the fibrous wick core and includes a plug mounted to an upper end of the wire spine, and a support hook that is coaxially and orthogonally mounted to an upper surface of the plug above the fibrous wick core, and wherein a predetermined quantity of the game luring liquid is contained within the container, and the wick core includes an elongate flexible wick leg coaxially mounted to and extending downwardly of the fibrous wick core into the game luring liquid, and wherein the container includes an opaque upper body portion formed about a major surface of the container and a transparent lower body portion to permit visual observation of available game luring liquid within the container, and wherein the wick core is defined as an elongate cylindrical fibrous body and includes a matrix of radially projecting legs mounted orthogonally relative to an exterior surface of the fibrous wick core and defined by a further predetermined porosity greater than the predetermined porosity of the fibrous wick core.

2. A game luring device as set forth in claim 1 wherein the wire spine is coextensively directed throughout the fibrous wick core and includes an upper terminal end mounted to a first loop member, the first loop member mounted to a spool connector, and the spool connector mounted to a second loop, the second loop mounted to the plug to permit relative rotation of the fibrous wick core relative to the plug.

3. A game luring device as set forth in claim 2 wherein each radially projecting leg includes a deformable wire core coextensive with and coaxially of each leg to permit selective positioning and orientation of each leg relative to the fibrous wick core.

* * * * *